United States Patent [19]
Ford

[11] Patent Number: 5,391,710
[45] Date of Patent: Feb. 21, 1995

[54] PRODUCTION OF AMINE FUNCTIONAL POLYMERS HAVING IMPROVED PURITY

[75] Inventor: Michael E. Ford, Coopersburg, Pa.

[73] Assignee: Air Products and Chemicals, Inc., Allentown, Pa.

[21] Appl. No.: 36,752

[22] Filed: Mar. 25, 1993

[51] Int. Cl.$^6$ ............................................. C08F 8/12
[52] U.S. Cl. .................................. 528/490; 528/481; 525/328.2; 525/383; 525/539
[58] Field of Search ................ 528/481, 490; 525/539, 525/383, 328.2

[56] References Cited

U.S. PATENT DOCUMENTS

| | | | |
|---|---|---|---|
| 4,316,840 | 2/1982 | Ford et al. | 544/402 |
| 4,316,841 | 2/1982 | Ford et al. | 544/402 |
| 4,393,174 | 7/1983 | Dawson et al. | 525/369 |
| 4,394,524 | 7/1983 | Ford et al. | 564/479 |
| 4,421,602 | 12/1983 | Brunnmueller et al. | 162/168.2 |
| 4,617,418 | 10/1986 | Ford et al. | 564/479 |
| 4,766,247 | 8/1988 | Ford et al. | 564/498 |
| 4,943,676 | 7/1990 | Pinschmidt, Jr. et al. | 525/383 |
| 5,055,197 | 10/1991 | Albright et al. | 210/638 |
| 5,081,207 | 1/1992 | Brown | 525/539 |
| 5,099,067 | 3/1992 | Barrett et al. | 564/321 |
| 5,185,308 | 2/1993 | Bartley et al. | 502/170 |

FOREIGN PATENT DOCUMENTS 61-118406 6/1986 Japan .

OTHER PUBLICATIONS

J. P. Brown, et al., "A Polymeric Drug for Treatment of Inflammatory Bowel Disease", J. Med. Chem., 26, p. 1300, (Oct. 1982).
M. K. Anever, et al., "Applications of Ammonium Formate Catalytic Transfer Hydrogenation . . . ", J. Org. Chem., 54, p. 1284, (Jun. 1988).

*Primary Examiner*—John Kight, III
*Assistant Examiner*—P. Hampton-Hightower
*Attorney, Agent, or Firm*—Mark L. Rodgers

[57] ABSTRACT

Amine functional polymers are purified to remove formate present by contact with a supported Group VIII metal hydrogen transfer catalyst under conditions favoring formate decomposition to carbon dioxide and hydrogen which are removed as gases. The preferred catalyst is palladium on carbon. Essentially salt-free poly(vinylamines) can be obtained by hydrolysis of polymers of N-vinylformamide in aqueous solution using ammonia or a volatile amine as a hydrolysis agent so that formate salts are the principal by-product of the hydrolysis which creates amine functionality in the polymer. Formate can then by removed by the catalytic decomposition described. Removal of carbon dioxide is enhanced by degassing the hydrolyzate prior to formate decomposition and by nitrogen purge of the polymer solution during the catalytic decomposition reaction.

16 Claims, No Drawings

PRODUCTION OF AMINE FUNCTIONAL POLYMERS HAVING IMPROVED PURITY

FIELD OF THE INVENTION

This invention relates to a process for making amine functional polymers with improved purity. In another aspect it relates to the removal of contaminating material from hydrolyzed vinylamide polymers by catalytic decomposition of contaminants.

BACKGROUND OF THE INVENTION

Interest in amine functional polymers has grown rapidly in recent years owing to their demonstrated utility in a broad spectrum of operations which capitalize on their solubility in water and their reactivity under relatively mild conditions. Such polymers have found uses as flocculants, filtration aids, paper strengthening agents, in enhanced oil recovery and as crosslinking agents for epoxy resins and polyurethanes. As the commercial value of these polymers has become recognized, more and more attention has been devoted to developing polymers containing amine functionality but tailored to specific needs.

Poly(vinylamine) (pVA) is perhaps the most promising of amine functional polymers because of its simplicity of manufacture and its versatility. Since its theoretical monomeric unit, vinylamine, is unstable, pVA is made indirectly by polymerizing a vinylamide, such as N-vinylformamide, and hydrolyzing the resulting polymer to develop its amine functionality. Complete hydrolysis is difficult if not impossible to achieve and it is well recognized that polymers made by this route and referred to as homopolymers of vinylamine are actually copolymers containing vinylamine units (perhaps as high as 98 mol percent) and N-vinylformamide units. A third unit, amidine, has also been recognized as an impurity which is to be minimized in order to increase primary amine functionality.

It has been known for over a decade that hydrochloric acid hydrolysis of poly(N-vinylacetamide) does not produce an absolute homopolymer but a product containing both amine and amidine units resulting from the acid-catalyzed condensation of adjacent amine and acetamido groups. See J. P. Brown et al., Journal of Medicinal Chemistry, 26, 1300 (1983). This article, citing unpublished work of Dawson and Brock, states on page 1304 that the amidine formation can be avoided by use of alkaline hydrolysis media.

U.S. Pat. No. 4,393,174, Dawson et al. (1983) expands on the Brown et al. disclosure in describing the preparation of poly(N-vinylacetamide) and poly(N-vinylformamide) with subsequent hydrolysis to poly(vinylamine) which is useful in making polymeric dyes. It is pointed out that hydrolysis of the amide groups is not easy and has typically been carried out in refluxing aqueous hydrochloric acid. Such conditions are said to result in amidine formation as an impurity which can be avoided by carrying out the hydrolysis at temperatures between 110° and 170° C. in an aqueous strong base such as NaOH.

U.S. Pat. No. 4,421,602, Brunnmueller et al., (1983) discloses making homopolymers of N-vinylformamide which are partially hydrolyzed so that from 10 to 90% of the formyl groups are split off to obtain a polymer containing 90 to 10 mol percent vinylamine units and 10 to 90 mol percent N-vinylamide units i n random distribution. The product described has no amidine units. Hydrolysis conditions disclosed involve the use of acids or bases at temperatures from 20° to 200° C. Particularly preferred temperatures are 70° to 90° C., which is the range within which all the operative examples fall. When using acid hydrolysis, exemplified by hydrochloric acid, the pH is 0 to 5. In an alkaline medium, exemplified by 10% sodium hydroxide solution, the pH is 9 to 14. It is stated that it is also possible to use ammonia, an amine or an alkaline earth metal base such as calcium hydroxide, or aqueous solutions of ammonia or an amine. This is not demonstrated, but it states that if the solvolysis is carried out in ammonia or an amine, formamide or a substituted formamide is obtained as a by-product.

The use of ammonia or a primary or secondary amine in the manufacture of water soluble poly(vinylamine) is disclosed in Japanese Laid-Open Patent Application No. 61-118406 (1986), but in this procedure ammonia or amine is used as a purification aid prior to base hydrolysis using a strongly basic material, preferably sodium or potassium hydroxide, at 20° to 100° C. There is no indication of amidine formation.

While it is recognized that carboxamides can be hydrolyzed under either acidic or basic conditions to amines, from a practical point of view it is said to be advantageous to hydrolyze amides under acidic catalysis, using conditions normally employed for protein degradation. See *Physical Organic Chemistry*, N. S. Isaacs, John Wiley and Sons, New York, (1987) pp. 484–485. In either case, however, when applied to the conversion of poly(N-vinylformamide) (pNVF), inorganic coproducts are formed along with the poly(-vinylamine). Base hydrolysis leads to alkali metal salts, such as sodium or potassium formate, while acid hydrolysis gives the corresponding salt of poly(vinylamine) and formic acid. Neutralization provides poly(vinylamine) (pVA) accompanied by a salt of the acid used for hydrolysis and, unless formic acid has been removed, a formate salt.

The desirability of a salt-free product is recognized in U.S. Pat. No. 4,943,676, Pinschmidt, Jr. et al. (1990). The problem is addressed by avoiding the hydrolysis procedure altogether. As disclosed in this patent, pNVF is subjected to a thermolytic reaction by heating to a temperature sufficient to effect thermodecarbonylation and yield a polymer containing free amine functionality. This product also contains amidine linkages formed from adjacent formamide and amine groups with loss of water. The polymer product disclosed contains randomly linked units of vinylamine, amidine and N-vinylformamide. The amidine units are said to be unwanted and can be suppressed by the presence of water which drives the equilibrium reaction back to the amine and formamide moieties.

In a field of chemistry unrelated to amine functional polymers, ammonium formate has been recognized as a suitable hydrogen donor in catalyzed hydrogenation and dehalogenation reactions. For example, M. K. Anwer, et al., J. Org. Chem., 54, 1284, (1989) describes the use of various palladium on carbon catalysts to effect dehalogenation of polychlorinated aryl compounds with ammonium formate serving as an in situ source of hydrogen. The efficacy of hydrogen transfer is said to increase with increased palladium loading on the support.

H. Wiener, et al., J. Org. Chem., 56, 4481 and 6145, (1991) present two articles on the use of formate salts in transfer reactions catalyzed with palladium supported on carbon. The first of these papers deals with hydrogenation of nitroarenes and the second with hydrogenation of aryl halides. Potassium and sodium formates are the preferred salts for this hydrogen transfer service. Ammonium formate is said to be less effective hydrogen donor, particularly for large scale synthesis.

U.S. Pat. No. 5,099,067, A. G. M. Barrett, et al., (1992), on the other hand, discloses conversion of nitro alcohols to hydroxy amines using ammonium formate with a carbon-supported palladium catalyst. Operable catalysts are said to be any of the conventional hydrogenation-dehydrogenation catalysts which include supported noble metals such as ruthenium, palladium or rhodium. In addition to carbon, suitable supports include clay, alumina and silica.

There has apparently been no recognition in the art that these hydrogen transfer or hydrogenation-dehydrogenation catalysts might be useful in promoting the elimination of troublesome formate salt forming impurities from certain products.

SUMMARY OF THE INVENTION

According to my invention, a process is provided for improving the purity of an amine functional polymer which is contaminated with formate ions. Formate is removed by contacting the polymer in aqueous solution with a supported hydrogen transfer catalyst, preferably a Group VIII metal, under conditions which cause formate decomposition and formation of carbon dioxide. The carbon dioxide, or at least a portion of it, can be removed from the polymer solution as a gas. This procedure provides a route by which salts, such as salts of sodium or potassium or chlorides, can be avoided in these polymers altogether. To accomplish this, instead of using acid or strong base hydrolysis to convert a polymer of N-vinylformamide to a poly(vinylamine), hydrolysis in an aqueous system is promoted by the addition of ammonia or a volatile amine. Formate ions are formed as a by-product of this hydrolysis. Thereafter, the hydrolyzed polymer in an aqueous solution is contacted with a supported Group VIII metal hydrogen transfer catalyst, such as palladium on carbon, at a temperature suitable for decomposition of formate to carbon dioxide and hydrogen which can then be removed as gases.

This procedure leads to a salt-free polymer which is desired for some applications which are sensitive to the presence of inorganics. For example, adhesives and coatings require essentially salt-free amine functional polymer. Traditional methods for removal of such impurities involve repeated precipitations, selective extraction or ultrafiltration. Such procedures entail tedious and costly routes for removal and disposal of stoichiometric quantities of inorganic coproduct but can be avoided by the process of my invention.

DETAILED DESCRIPTION OF THE INVENTION

Amine functional polymers which can be improved in purity by the procedures of this invention are polymers which contain either primary or secondary amine groups distributed along the polymer chain but also have formate ions associated with the polymer, either as separate formate salts mixed with the polymer or as a salt of the polymer itself, such as in poly(vinylammonium formate). Such a polymer is described in my copending U.S. patent application entitled "Poly(-Vinylammonium Formate) and Process for Making Amidine-Containing Polymers", filed Mar. 25, 1993 (Case 186PUS05027). This application also describes a process for making terpolymers of vinylamine, amidine and N-vinylformamide by aqueous hydrolysis of poly(N-vinylformamide) under controlled conditions of temperature and time, preferably with ammonia or amine as the sole agent promoting hydrolysis. These polymers are formed containing by-product formate and are good candidates for the purification approach of the present invention.

The polymers for which my purification technique is best suited are poly(vinylamines) made by hydrolysis of poly(N-vinylformamide. These can be either homopolymers or copolymers based on vinylamine. It should be understood that the term "poly(vinylamine)" as used to describe my invention defines a class of polymers having an ethylenic backbone and amine functionality along the polymer chain. Although homopolymers are preferred, the invention can also be applied to copolymers derived from N-vinylformamide and comonomers such as ethylene, styrene, vinyl acetate, acrylamide, acrylic acid, (meth)acrylic esters, diallyl dimethylammonium chloride (DADMAC), acrylamidomethylpropane sulfonic acid (AMPS), sodium vinyl sulfonate (SVS), and the like. Hydrolysis of vinyl acetate copolymers gives vinyl alcohol functionality also, Copolymers containing copolymerized allyl and diallylamine can also be used. Up to 50 mol percent of the vinylamine copolymer can be made up of such comonomer units provided the polymer formed is water soluble and no by-products of hydrolysis are formed which interfere with the catalytic decomposition of formate. Because of the latter condition., if comonomers are used, ethylene or styrene or other hydrocarbyl copolymerizable monomers are preferred.

Methods for making such poly(vinylamines) are well known and described in the background prior art cited above. In general, the polymerizations are carried out in aqueous solution using a water soluble azo compound as a catalyst and N-vinylformamide as the principal monomer. The poly(N-vinylformamide) (pNVF) can be hydrolyzed directly in the polymerization solution or the polymer can be recovered and redissolved in water as a dry powder.

The molecular weight of the pNVF can vary over a broad range and still be useful in practicing the invention. The polymer should be one which is considered to be normally solid, thereby placing a practical lower limit on its molecular weight, and it should be water soluble, which imposes an upper limit. Beyond that, it can be said that desirably the weight average molecular weights of useful polymers fall in the range of 10,000 up to $10^7$. Preferably these molecular weights will be between 40,000 and $10$.

The hydrolysis reaction is carried out with the pNVF in an aqueous solution and in the absence of any strong acid or base normally used in, this service, such as HCl or NaOH. The hydrolysis can be successfully performed without any hydrolysis promoting agent at essentially neutral conditions, for example a pH of about 6 to 8. I prefer, however, to use a minor amount of either ammonia or an amine which has a boiling point below 100° C. Such lower boiling amines are preferably lower alkylamines such as methylamine, dimethylamine, trimethylamine, ethylamine, diethylamine, triethylamine, isopropyl amine, diisopropylamine, propylamine, and the like. Primary or secondary amines are favored for this service. Ammonia is, however, the preferred agent because of the ease with which it can be added and removed once the hydrolysis is completed. The concentration of ammonia or amine should be below 50 weight percent and is preferably in the range of 0.5 to 35 weight percent. The quantity of water required is that sufficient to keep the polymer in solution.

The temperature of the hydrolysis should be above 90° C. but below 175° C., preferably in the range of 100° to 160° C. At lower temperatures conversion of the formyl groups on the pNVF is insufficient and attempting to overcome this disadvantage by increasing ammonia concentration is counterproductive. At higher temperatures amidine content of the polymer product may be less than desired. Hydrolysis above 100° C. is favored for best results and temperatures in the range of about 140° to 160° C. are preferred. The pressure must be sufficient to keep the polymer solution in a liquid phase at the selected temperature.

The time of reaction can readily be determined to best suit the results desired under the conditions chosen for the hydrolysis. The economics of the process will determine the time to a large extent because most of the reaction occurs early in the hydrolysis and a point of diminishing returns may be reached fairly soon. For example, data show that most of the conversion, if it is going to occur, will take place within about two hours although additional reaction continues up to six hours. In general, reaction times are about 0.5 to 12 hours.

Following the hydrolysis step the polymer product can be recovered and worked up in the usual manner, precipitating the polymer from solution followed by washing and extraction or filtration to remove undesirable impurities, depending upon the use for which the product is intended. This process has the advantage that, under the conditions of the hydrolysis (particularly at the preferred temperatures), formamide is not a significant by-product. Formate ions are present, but these can be dealt with by catalytic decomposition in accordance with my invention.

Although the polymer product can be recovered directly from the hydrolysis reaction mixture, as described above, I prefer to subject the polymer solution following hydrolysis to degassing conditions which cause the volatilization of ammonia or amine present in the mixture, including ammonium and alkylammonium ions associated with by-product formate ions. The degassing can be effected by warming the mixture or lowering the pressure, or both, and can be assisted by physical enhancement such as the use of an inert stripping gas, preferably nitrogen, or by mechanical means which increase the liquid/vapor interfacial surface area. Removal of the ammonia or amine in this manner has two advantages. When the catalytic decomposition of formate is carried out to provide a salt-free product, the removal of ammonia or amine at this stage following the hydrolysis step eliminates the possibility of ammonia or amine reacting with carbon dioxide decomposition product to form solid carbonate or carbamate products in do stream equipment causing plant downtime. Another advantage is the formation of poly(vinylammonium formate) by the removal of ammonia or amine at this stage of the process. Removing ammonium and alkylammonium ions from the polymer solution following hydrolysis causes the formate ions present in the solution to associate with the vinylamine groups present in the polymer. This polymer product, poly(vinylammonium formate), can be recovered, and used as the preferred feed to catalytic decomposition.

The poly(vinylammonium formate) solution formed by the degassing step contains no other, salts or ionic coproducts of the hydrolysis. When it is used as the feed for catalytic decomposition of the formate ions to produce a salt-free product, enhanced evolution of carbon dioxide is obtained.

The catalytic decomposition of formate present in the polymer to be purified is carried out with the polymer in aqueous solution and at an elevated temperature which promotes the desired decomposition. Generally the temperature is at least 40° C. and is not over 100° C., unless pressure is applied to maintain a liquid phase for the polymer solution. There is no need to exceed 100° C. in order to have acceptable reaction rates. Reflux conditions at atmospheric pressures have been found to be quite satisfactory.

The catalyst for the decomposition reaction can be any of the supported Group VIII metal hydrogen transfer or hydrogenation-dehydrogenation catalysts known in the art. These Group VIII metals should have an atomic number above 26 but, otherwise, suitable metals include cobalt, nickel, ruthenium, rhodium, palladium, iridium and platinum. The preferred metal is palladium. Suitable supports are also known in the art for heterogeneous hydrogen transfer catalysts and include carbon, alumina, silica, silica/alumina, titania, calcium carbonate, barium sulfate, and the like. Graphitic carbon is preferred. The choice of support will depend upon the choice of Group VIII metal for best results. The efficiency of formate decomposition is also influenced by the dispersion of the metal on the support. This can readily be determined for a given operation, but, in general it is desirable that the metal not be as disperse as 1 or 2% on the support. A less disperse catalyst with higher metal loading of about 3 to 12% has been shown to give good results at low overall catalyst concentrations. Otherwise, very good results have been shown with overall catalyst loadings to the reaction on the order of 1 to 5 weight percent catalyst (dry basis) based upon the volume of the polymer solution being treated. Following the decomposition reaction, the solid heterogeneous catalyst particles can easily be separated from the polymer solution by filtration or centrifugation.

The time of reaction for the catalytic decomposition can vary over a broad range but will generally be in the order of about 15 minutes up to 8 hours. The reaction can be carried out in a batch mode but is also adaptable to a continuous process, for example, using a Buss loop reactor. During the decomposition of formate ions, which break down into carbon dioxide and hydrogen, decomposition products are removed as gases. This removal of gas products can be assisted by purging the solution with an inert gas, such as nitrogen, during the reaction. Evolution of carbon dioxide at this stage is also enhanced by the prior degassing of ammonia or alkylamine from the hydrolyzate before commencing the catalytic decomposition of formate. Such prior removal of ammonia or amine also prevents the formation of solid ammonium carbonate or carbamate in downstream equipment. Effluent gases from either stage can be separated and recovered.

The product of this process, in contrast to those of the prior art, does not contain additional inorganics, either as the sodium salt of formic acid or as the hydrochloride or hydrosulfate salt of poly(vinylamine). Because this product has a lower inorganic content than it would have under the prior art procedures, it has enhanced utility in applications sensitive to such inorganics and in which the prior art products would be unacceptable unless subjected to much more rigorous purification techniques.

Other advantages and features of my invention will be apparent to those skilled in the art from the following examples which are illustrative only and should not be construed to limit my invention unduly.

EXAMPLES 1-10

These examples demonstrate aqueous hydrolysis of low molecular weight poly(N-vinylformamide) using ammonia as a hydrolysis promoting agent at elevated temperatures. The pNVF had a weight average molecular weight of about 60,000. The dry, powdered pNVF was added to a 100 mL stainless steel Parr reactor and dissolved in deionized water and/or aqueous ammonia. The reactor was sealed and pressure checked with nitrogen at 500 to 600 psig. In Example 3 anhydrous ammonia was added to the aqueous polymer solution from a pressurized cylinder. Stirring was started and the mixture heated to the desired temperature for the desired length of time. Subsequently the reaction mixture was cooled to room temperature and excess ammonia was vented with no other degassing procedure. The polymer product was recovered and analyzed by $^1$H and $^{13}$C NMR. The results are shown in Tables 1 and 2. With the exception of Example 3 in which conversion was too low and the product was not analyzed, the polymer formed was a terpolymer of vinylamine, amidine and N-vinylformamide.

identity as formate or formamide. Table 2 shows selectivity of conversion in terms of polymer composition.

A comparison of Examples 1 and 2 shows that although hydrolysis occurred with 28% aqueous ammonia at 100° C., much better results were obtained at 150° C. In Example 1, conversion was lower than desired and a fairly high proportion of the hydrolyzed formamide groups were converted to formamide rather than formate as preferred. Although Example 1 was operative in making terpolymer, neither the conversion nor composition met the preferred objective. Results were far better in Example 2 which operated at 150° C.

In Example 3 an attempt was made to compensate for the lower temperature of 100° C. by increasing ammonia concentration to 534. Conversion was so low that the polymer formed was not analyzed.

Examples 2, 4 and 6 show that ammonia concentration could be drastically reduced from 28% to 14% and 7% without serious alteration of results. In fact, Example 6 run at 7% ammonia gave the best conversion and highest amidine content among these three Examples.

A comparison of Examples 4 and 5 shows that most of the conversion occurred within the first 2 hours of the reaction. The six hour run of Example 4 favored selectivity to amine rather than amidine. This demonstrates that reaction time can be used in the process of the invention to control terpolymer composition.

Examples 7, 8 and 9 show that good conversions of pNVF were obtained even with quite low concentrations of ammonia, and selectivity to amine units decreased as ammonia concentration decreased. Consequently, this parameter can be manipulated to obtain

TABLE 1

| Example | pNVF (gm) | 28% Aq NH$_3$ (ml) | Water (gm) | NH$_3$ (gm) | [NH$_3$] (wt. %) | T (°C.) | t (hr) | Conv (%)[a] | Selectivity pVA[b] | Amidine[b] | Formate[c] |
|---|---|---|---|---|---|---|---|---|---|---|---|
| 1 | 3.72 | 50.0 | — | — | 28.0 | 100 | 6 | 46 | 61 | 39 | 62 |
| 2 | 3.74 | 50.0 | — | — | 28.0 | 150 | 6 | 91 | 90 | 10 | 94 |
| 3 | 3.73 | — | 20.0 | 22.4 | 53.0 | 100 | 6 | 14 | NA[d] | NA[d] | NA[d] |
| 4 | 3.72 | 25.0 | 25.0 | — | 14.0 | 150 | 6 | 92 | 92 | 8 | 95 |
| 5 | 3.76 | 25.0 | 25.0 | — | 4.0 | 150 | 2 | 86 | 81 | 19 | 96 |
| 6 | 3.75 | 12.5 | 37.5 | — | 7.0 | 150 | 6 | 93 | 86 | 14 | 95 |
| 7 | 3.75 | 6.0 | 44.0 | — | 3.4 | 150 | 6 | 85 | 66 | 34 | 97 |
| 8 | 3.76 | 3.0 | 47.0 | — | 1.7 | 150 | 6 | 87 | 64 | 36 | 97 |
| 9 | 3.75 | 1.5 | 48.5 | — | 0.8 | 150 | 6 | 82 | 50 | 50 | 100 |
| 10 | 3.76 | — | 50.0 | — | 0.0 | 150 | 6 | 52 | 46 | 54 | 100 |

[a]Mole % of formamide groups hydrolyzed; balance remains as pendant formamide.
[b]Mole %, based on product functional group.
[c]Mole % of hydrolyzed foreamide groups converted to formate; balance is formamide.
[d]Not analyzed.

TABLE 2

| | Selectivity | | |
|---|---|---|---|
| Example | pNVF | pVA | Amidine |
| 1 | 54 | 28 | 18 |
| 2 | 9 | 82 | 8 |
| 3 | 86 | NA[b] | NA[b] |
| 4 | 8 | 85 | 7 |
| 5 | 14 | 70 | 16 |
| 6 | 7 | 80 | 13 |
| 7 | 15 | 56 | 29 |
| 8 | 13 | 56 | 31 |
| 9 | 18 | 41 | 41 |
| 10 | 48 | 24 | 28 |

[a]Mole of each functionality in isolated terpolymer.
[b]Not analyzed.

Table 1 shows reaction conditions of temperature, time and hydrolysis medium for each of Examples 1-10 with hydrolysis results in terms of conversion, relative formation of amine and amidine units and by-product different amine/amidine ratios.

Example 10 was a demonstration of aqueous hydrolysis on pNVF without ammonia or amine. Significant conversion occurred at 150° C. and no formamide by-product was formed in either Example 10 or Example 9 which used 0.8% ammonia. A comparison the these two Examples shows that a very small amount of ammonia makes a big difference in terpolymer composition, changing from 48 mol percent N-vinylformamide units in Example 10 to only 18 mol percent in Example 9. Clearly, the presence of at least a fraction of a percent of ammonia is preferred in the practice of the invention.

EXAMPLES 11 AND 12

The procedures of Examples 2 and 6 were repeated using a pNVF of medium molecular weight (weight average molecular weight of about 409,000). Hydrolysis results are given in Table 3.

TABLE 3

| Example | pNVF (gm) | 28% Aq NH$_3$ (ml) | Water (gm) | NH$_3$ (gm) | [NH$_3$] (wt. %) | T (°C.) | t (hr) | Conv (%)$^a$ | Selectivity pVA$^b$ | Ami- dine$^b$ | For- mate$^c$ |
|---|---|---|---|---|---|---|---|---|---|---|---|
| 11 | 3.75 | 50.0 | — | — | 28.0 | 150 | 6 | 86 | 84 | 16 | 91 |
| 12 | 3.75 | 12.5 | 37.5 | — | 7.0 | 150 | 6 | 91 | 86 | 14 | 94 |

$^a$Mole % of formamide groups hydrolyzed; balance remains as pendant formamide.
$^b$Mole %, based on product functional group.
$^c$Mole % of hydrolyzed formamide groups converted to formate; balance is formamide.

A comparison of Examples 11 and 12 with Examples 2 and 6 from Table 1 shows that polymer molecular weight within the ranges of these Examples does not significantly affect hydrolysis results using the procedures of this invention.

EXAMPLES 13-36

Following essentially the procedures of Examples 2, 4 and 6, terpolymers of vinylamine, amidine and N-vinylformamide were made for use in runs demonstrating catalytic decomposition of contaminating salts and removal of the gaseous products of decomposition. The terpolymers were made by aqueous ammonia hydrolysis of poly(N-vinylformamide). In each of Examples 13 through 36 the terpolymer hydrolyzate (25 mL) was introduced into a 100 mL three-necked round bottom flask equipped with a magnetic stirrer, reflux condenser, and a gas dispersion tube. In Examples 24 and 26 through 29 the hydrolyzate was degassed to remove ammonia by heating to 100° C. 30 minutes with stirring and passage of nitrogen through the polymer solution at a rate of about 30 to 45 mL per minute. This degassing step converted the terpolymer to poly(vinylammonium formate) as a terpolymer of vinylammonium formate, amidine and N-vinylformamide.

After degassing the aqueous solutions of pVAF were allowed to cool to 40°-50° C. before beginning the formate decomposition. To these solutions of Examples 24 and 26-29 as well as to the hydrolyzates of the remaining Examples were added appropriate amounts of hydrogen transfer or hydrogenation-dehydrogenation catalyst as identified in Table 4. These catalysts are recognized supported Group VIII metal hydrogen transfer catalysts. The reaction mixtures were stirred and heated to the desired temperature for lengths of time as indicated for each Example in Table 4. In Examples 17 through 36 a nitrogen purge was used to assist in removal of gaseous products of decomposition which were carbon dioxide and hydrogen. Vigorous effervescence was observed in the early stages of the reactions. Subsequently the reaction solutions were cooled to room temperature and the polymer products were recovered by filtration to remove catalyst. Samples were analyzed by $^1$H and $^{13}$C NMR. Typically, the products were terpolymers of vinylamine, amidine and N-vinylformamide containing little or no formate salt with the relative proportions of each functional monomeric unit essentially the same as for the terpolymers after initial hydrolysis as reported in Table 2. The efficiency of each process was determined from the conversion based upon the mol percent of formate decomposed and by the carbon dioxide evolution in terms of mol percent of the quantity of formate decomposed. The results are reported in Table 4.

TABLE 4

| Example | Catalyst (loading)$^a$ | T (°C.) | t (hr) | Conv (%)$^b$ | N$_2$ Purge | Initial NH$_3$ Removal | % CO$_2$ Evolved$^c$ |
|---|---|---|---|---|---|---|---|
| 13 | 5% Pd/C (2.5) | 80 | 6 | 91 | No | No | 51 |
| 14 | 10% Pd/C (2.5) | 80 | 6 | >95 | No | No | <20 |
| 15 | 5% Pd/C (2.5) | 100 | 6 | 94 | No | No | 71 |
| 16 | 10% Pd/C (2.5) | 100 | 6 | 89 | No | No | 84 |
| 17 | 5% Pd/C (2.5) | 100 | 6 | 90 | Yes | No | 78 |
| 18 | 5% Pd/C (1) | 100 | 3.5 | 78 | Yes | No | 82 |
| 19 | 1% Pd/C (5) | 100 | 3.5 | 8 | Yes | No | NA$^d$ |
| 20 | 5% Pd/Al$_2$O$_3$ (2.3) | 100 | 3.5 | 77 | Yes | No | 60 |
| 21 | 5% Pd/CaCO$_3$ (5) | 100 | 3.5 | 92 | Yes | No | 83 |
| 22 | 5% Pd/BaSO$_4$ (2.4) | 100 | 3.5 | 88 | Yes | No | 88 |
| 23 | 5% Pd/C (2.5) | Reflux | 5 | 87 | Yes | No | 93 |
| 24 | 5% Pd/C (2.5) | Reflux | 5 | 84 | Yes | Yes | 94 |
| 25 | 10% Pd/C (2.5) | Reflux | 6 | 89 | Yes | No | 81 |
| 26 | 10% Pd/C (2.4) | Reflux | 6 | 90 | Yes | Yes | 100 |
| 27 | 5% Pd/C (2) | Reflux | 3.5 | 80 | Yes | Yes | ≧98 |
| 28 | 5% Pd/Al$_2$O$_3$ (2.4) | Reflux | 3.5 | 86 | Yes | Yes | 100 |
| 29 | 5% Pd/CaCO$_3$ (2.4) | Reflux | 3.5 | 90 | Yes | Yes | 100 |
| 30 | 5% Ru/C (2.4) | 100 | 3.5 | 16 | Yes | No | NA$^d$ |
| 31 | 5% Ru/Al$_2$O$_3$ (2.4) | 100 | 3.5 | 0 | Yes | No | — |
| 32 | 5% Rh/Al$_2$O$_3$ (2.4) | 100 | 3.5 | 9 | Yes | No | NA$^d$ |
| 33 | 5% Rh/C (2.4) | Reflux | 3.5 | 9 | Yes | No | NA$^d$ |
| 34 | 5% Pt/C (5) | Reflux | 3.5 | 9 | Yes | No | NA$^d$ |
| 35 | 5% Pt/Al$_2$O$_3$ (5) | Reflux | 3.5 | 6 | Yes | No | NA$^d$ |
| 36 | 8% Co/Al$_2$O$_3$ | Reflux | 3.5 | 10 | Yes | No | Na$^d$ |

$^a$Wt % catalyst (dry basis), baesd on volume of hydrolyzate.
$^b$Mole % formate decomposed.
$^c$Mole %, based on quantity of formate decomposed.
$^d$Not analyzed.

AS shown by the data of Table 4, Examples 13-16 demonstrated that high conversions of formate to carbon dioxide can be obtained with either 5% or 10% palladium supported on graphitic carbon at either 80° C. or 100° C. A comparison of Examples 13 and 14 with Examples 15 and 16 showed that a higher degree of carbon dioxide evolution was obtained at the higher reaction temperature. By comparing Example 17 with Example 15 it can be seen that a nitrogen purge during catalytic decomposition enhanced removal of carbon dioxide.

Example 18 showed that good conversion of formate to carbon dioxide can be obtained with a relatively low loading of 5% palladium on carbon. Comparing these data with those of Example 19, however, shows that the dispersion of the metal on the support may be more important than the total amount of palladium present. A lower dispersion (or higher metal loading in the support) appears to be needed for effective formate decomposition.

Examples 20–22 showed that palladium supported on alumina, calcium carbonate or barium sulfate was also effective for formate decomposition. Among these supports, alumina is at least favored owing to the somewhat lower conversion obtained.

Examples 23 and 24 showed the essentially complete carbon dioxide removal was attained when formate decomposition was carried out at reflux conditions (approximately 100° C.) with a nitrogen purge during the process, and preferably with polymer solution from which ammonia had been degassed prior to catalytic decomposition. A comparison of Examples 25 and 26 confirmed this advantage for ammonia degassing. In these Examples degassing ammonia formed the poly(vinylammonium formate) prior to formate decomposition with a 10% palladium on carbon catalyst. Example 26 which used pVAF as its feed showed essentially complete removal of carbon dioxide. Both Examples 25 and 26 had high conversions and good $CO_2$ removal. Examples 27–29 further confirmed the advantage of sequential ammonia degassing and use of a nitrogen purge during formate decomposition in obtaining complete $CO_2$ removal.

Examples 30–36 evaluated other hydrogen transfer catalysts in formate decomposition for production of salt-free amine functional polymer. While ruthenium on carbon showed a little activity for formate decomposition (Example 30), the ruthenium supported on alumina used in Example 31 was inactive. Since both carbon and alumina supports performed well for palladium (Examples 27 and 28) and ruthenium/carbon showed some activity, it is believed that conditions can be found without undue experimentation under which $Ru/Al_2O_3$ is operative. Examples 32–36 showed operability but low activity for supported rhodium, platinum and cobalt. Clearly, however, palladium is the preferred Group VIII metal in a supported hydrogen transfer catalyst for this service.

Other embodiments of my invention will be apparent to those skilled in the art from the foregoing disclosure without departing from the spirit or scope of the invention.

I claim:

1. A process for improving the purity of an amine functional polymer contaminated with formate ions which comprises contacting said polymer in aqueous solution with a supported Group VIII metal hydrogen transfer catalyst at a temperature of at least 80° C. under conditions causing formate decomposition to form carbon dioxide, and removing from the polymer solution at least a portion of said carbon dioxide as a gas.

2. The process of claim 1 wherein said catalyst is palladium on a support.

3. The process of claim 2 wherein said support is carbon.

4. The process of claim 1 wherein hydrogen is formed as a product of said decomposition and at least a portion of said hydrogen is removed as a gas from the polymer solution.

5. The process of claim 4 wherein formate ions are present in the polymer solution as ammonium formate.

6. The process of claim 4 wherein formate ions are present in the polymer solution as poly(vinylammonium formate).

7. A process for making poly(vinylamine) have improved purity which comprises:
   (a) hydrolyzing a polymer of N-vinylformamide in aqueous solution in the presence of ammonia or a volatile amine,
   (b) contacting the polymer which has been hydrolyzed in step (a) with a supported Group VIII metal hydrogen transfer catalyst under conditions which include the polymer being in aqueous solution and a temperature of at least 80° C. to cause decomposition of formate ions to carbon dioxide and hydrogen, and
   (c) removing carbon dioxide and hydrogen as gases from the solution of step (b).

8. The process of claim 7 wherein ammonia or volatile amine is removed from the polymer solution of step (a) by degassing prior to step (b).

9. The process of claim 7 wherein said catalyst is separated from the polymer solution following formate decomposition.

10. The process of claim 7 wherein an inert gas is used to purge said gases from the solution in step (c).

11. The process of claim 7 wherein said Group VIII metal is palladium.

12. The process of claim 11 wherein said catalyst is palladium supported on carbon.

13. The process of claim 7 wherein ammonia is used as a hydrolysis agent in step (a).

14. The process of claim 7 wherein a water soluble alkylamine is used as a hydrolysis agent in step (a).

15. The process of claim 8 wherein poly(vinylammonium formate) is recovered from the polymer solution following said degassing of ammonia or amine and redissolved in water prior to step (b).

16. The process of claim 8 wherein said degassing is assisted by passing an inert gas through the polymer solution after hydrolysis in step (a).

* * * * *